(12) United States Patent
Boo

(10) Patent No.: US 10,830,268 B2
(45) Date of Patent: Nov. 10, 2020

(54) FURNITURE PANEL

(71) Applicant: Valinge Innovation AB, Viken (SE)

(72) Inventor: Christian Boo, Kagerod (SE)

(73) Assignee: VALINGE INNOVATION AB, Viken (CH)

( * ) Notice: Subject to any disclaimer, the term of this patent is extended or adjusted under 35 U.S.C. 154(b) by 570 days.

(21) Appl. No.: 14/573,572

(22) Filed: Dec. 17, 2014

(65) Prior Publication Data
US 2015/0198191 A1 Jul. 16, 2015

(30) Foreign Application Priority Data

Jan. 10, 2014 (SE) ...................................... 1450018

(51) Int. Cl.
F16B 12/00 (2006.01)
F16B 12/46 (2006.01)
A47B 88/90 (2017.01)
A47B 47/04 (2006.01)

(52) U.S. Cl.
CPC ............ F16B 12/46 (2013.01); A47B 47/042 (2013.01); A47B 2088/902 (2017.01); F16B 2012/466 (2013.01); Y10T 403/7073 (2015.01)

(58) Field of Classification Search
CPC ............... F16B 2012/466; F16B 12/46; A47B 2088/0037; A47B 47/042; E04F 2201/0523; E04F 15/02038; E04F 2201/0153
See application file for complete search history.

(56) References Cited

U.S. PATENT DOCUMENTS

| 291,032 | A | * | 1/1884 | Cleland | ................... B65D 9/32 217/65 |
| 634,581 | A | | 10/1899 | Miller | |
| 701,000 | A | | 5/1902 | Ahrens | |

(Continued)

FOREIGN PATENT DOCUMENTS

| CH | 685 276 A5 | 5/1995 |
| CH | 696 889 A5 | 1/2008 |

(Continued)

OTHER PUBLICATIONS

U.S. Appl. No. 14/972,949, Christian Boo and Peter Derelöv, filed Dec. 17, 2015.

(Continued)

Primary Examiner — Matthew R McMahon
(74) Attorney, Agent, or Firm — Buchanan Ingersoll & Rooney P.C.

(57) ABSTRACT

A furniture panel is provided, in which a first element and a second element are mechanically locked together. A first tongue is provided at a first edge of the first element, the first tongue cooperating with a first tongue groove provided at a second edge of the second element for locking the first and second elements in a vertical direction, and a second tongue at the second edge of the second element, the second tongue cooperating with a second tongue groove at the first edge of the first element for locking the first and second elements in the vertical direction. A first pair of locking surfaces is provided above the second tongue and the second tongue groove for locking in a horizontal direction, and a second pair of locking surfaces is provided below the first tongue and the first tongue groove for locking in the horizontal direction.

21 Claims, 2 Drawing Sheets

(56) References Cited

U.S. PATENT DOCUMENTS

| | | | |
|---|---|---|---|
| 861,911 A | 7/1907 | Stewart | |
| 881,673 A | 3/1908 | Ellison | |
| 1,534,468 A * | 4/1925 | Shea, Jr. | B65D 7/12 |
| | | | 403/382 |
| 1,954,242 A | 4/1934 | Heppenstall | |
| 2,360,451 A | 10/1944 | Stone | |
| 2,362,904 A | 11/1944 | Kramer | |
| 2,496,184 A | 1/1950 | Von Canon | |
| 3,195,968 A | 7/1965 | Freeman | |
| 3,284,152 A | 11/1966 | Schörghuber | |
| 3,347,610 A | 10/1967 | Pilliod | |
| 3,410,441 A | 11/1968 | Rhyne | |
| 3,722,704 A | 3/1973 | Piretti | |
| 3,722,971 A | 3/1973 | Zeischegg | |
| 3,784,271 A | 1/1974 | Schreiber | |
| 3,885,845 A | 5/1975 | Krieks | |
| 4,089,614 A | 5/1978 | Harley | |
| 4,099,887 A | 7/1978 | MacKenroth | |
| 4,116,510 A | 9/1978 | Franco | |
| 4,142,271 A | 3/1979 | Busse | |
| 4,279,397 A | 7/1981 | Larsson | |
| 4,509,648 A | 4/1985 | Govang | |
| 4,597,122 A | 7/1986 | Handler et al. | |
| 4,750,794 A | 6/1988 | Vegh | |
| 4,752,150 A | 6/1988 | Salice | |
| 4,883,331 A | 11/1989 | Mengel | |
| 4,886,326 A | 12/1989 | Kuzyk | |
| 4,909,581 A | 3/1990 | Haheeb | |
| 5,004,116 A | 4/1991 | Cattarozzi | |
| 5,114,265 A * | 5/1992 | Grisley | B27F 1/12 |
| | | | 144/144.1 |
| 5,209,556 A | 5/1993 | Anderson | |
| 5,212,925 A | 5/1993 | McClinton | |
| 5,360,121 A | 11/1994 | Sothman | |
| 5,475,960 A | 12/1995 | Lindal | |
| 5,499,886 A | 3/1996 | Short et al. | |
| 5,527,103 A | 6/1996 | Pittman | |
| 5,658,086 A | 8/1997 | Brokaw et al. | |
| 5,893,617 A | 4/1999 | Lee | |
| 5,950,389 A | 9/1999 | Porter | |
| 6,413,007 B1 | 7/2002 | Lambright | |
| 6,505,452 B1 * | 1/2003 | Hannig | B27F 1/04 |
| | | | 52/582.1 |
| 6,675,979 B2 * | 1/2004 | Taylor | A47B 47/042 |
| | | | 108/153.1 |
| 6,769,219 B2 * | 8/2004 | Schwitte | E04F 15/02 |
| | | | 52/590.3 |
| 6,827,028 B1 | 12/2004 | Callaway | |
| 7,451,535 B2 | 11/2008 | Wells et al. | |
| 7,451,578 B2 * | 11/2008 | Hannig | E04F 15/02 |
| | | | 52/392 |
| 7,584,583 B2 | 9/2009 | Bergelin et al. | |
| 7,621,092 B2 | 11/2009 | Groeke et al. | |
| 7,641,414 B1 * | 1/2010 | Joyce | A47B 47/042 |
| | | | 403/231 |
| 7,721,503 B2 * | 5/2010 | Pervan | E04F 15/02 |
| | | | 52/177 |
| 7,818,939 B2 | 10/2010 | Bearinger | |
| 7,998,549 B2 | 8/2011 | Susnjara | |
| 8,038,363 B2 * | 10/2011 | Hannig | B27F 1/04 |
| | | | 403/339 |
| 8,042,311 B2 | 10/2011 | Pervan | |
| 8,220,217 B2 * | 7/2012 | Muehlebach | E04F 15/02 |
| | | | 403/320 |
| 8,365,499 B2 * | 2/2013 | Nilsson | E04F 15/10 |
| | | | 52/592.1 |
| 8,387,327 B2 | 3/2013 | Pervan | |
| 8,495,849 B2 * | 7/2013 | Pervan | E04F 15/02 |
| | | | 52/592.1 |
| 8,505,257 B2 * | 8/2013 | Boo | B27F 1/02 |
| | | | 52/582.1 |
| 8,544,230 B2 | 10/2013 | Pervan | |
| 8,615,952 B2 * | 12/2013 | Engstrom | E04F 15/02038 |
| | | | 52/489.2 |
| 8,745,952 B2 * | 6/2014 | Perra | E04F 15/02 |
| | | | 52/530 |
| 8,764,137 B2 | 7/2014 | Fehre | |
| 8,833,028 B2 * | 9/2014 | Whispell | E04F 15/02 |
| | | | 52/588.1 |
| 8,887,468 B2 | 11/2014 | Håkansson et al. | |
| 9,175,703 B2 | 11/2015 | Maertens | |
| 9,290,948 B2 * | 3/2016 | Cappelle | E04F 15/02 |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,745,756 B2 * | 8/2017 | Hannig | E04F 15/02 |
| 9,758,973 B2 * | 9/2017 | Segaert | B29C 70/081 |
| 9,809,983 B2 * | 11/2017 | Trudel | E04F 15/04 |
| 9,945,121 B2 | 4/2018 | Derelöv | |
| 10,202,996 B2 | 2/2019 | Håkansson et al. | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,669,716 B2 | 6/2020 | Derelöv et al. | |
| 10,670,064 B2 | 6/2020 | Derelöv et al. | |
| 2006/0101769 A1 | 5/2006 | Pervan et al. | |
| 2006/0236642 A1 | 10/2006 | Pervan | |
| 2006/0273085 A1 | 12/2006 | Casto | |
| 2007/0006543 A1 | 1/2007 | Engström | |
| 2008/0066415 A1 | 3/2008 | Pervan | |
| 2008/0216435 A1 * | 9/2008 | Nolan | E04F 13/08 |
| | | | 52/588.1 |
| 2008/0236088 A1 | 10/2008 | Hannig et al. | |
| 2009/0064624 A1 | 3/2009 | Sokol | |
| 2010/0083603 A1 | 4/2010 | Goodwin | |
| 2010/0173122 A1 | 7/2010 | Susnjara | |
| 2010/0289389 A1 | 11/2010 | Crabtree, II | |
| 2011/0225921 A1 | 9/2011 | Schulte | |
| 2011/0225922 A1 | 9/2011 | Pervan et al. | |
| 2011/0280655 A1 | 11/2011 | Maertens et al. | |
| 2011/0283650 A1 | 11/2011 | Pervan et al. | |
| 2012/0009383 A1 | 1/2012 | Hardesty | |
| 2012/0027967 A1 | 2/2012 | Maertens et al. | |
| 2012/0073235 A1 | 3/2012 | Hannig | |
| 2012/0124932 A1 | 5/2012 | Schulte et al. | |
| 2012/0145845 A1 | 6/2012 | Hightower | |
| 2012/0180416 A1 * | 7/2012 | Perra | E04F 15/02 |
| | | | 52/309.1 |
| 2012/0279161 A1 | 11/2012 | Håkansson et al. | |
| 2012/0286637 A1 | 11/2012 | Fehre | |
| 2013/0014463 A1 | 1/2013 | Pervan | |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0097846 A1 | 4/2013 | Pettigrew | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2014/0055018 A1 | 2/2014 | Shein et al. | |
| 2014/0286701 A1 | 9/2014 | Sauer | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0230600 A1 | 8/2015 | Schulte | |
| 2015/0368896 A1 | 12/2015 | Schulte | |
| 2016/0000220 A1 | 1/2016 | Devos | |
| 2016/0007751 A1 | 1/2016 | Derelöv | |
| 2016/0145029 A1 | 5/2016 | Ranade et al. | |
| 2016/0174704 A1 | 6/2016 | Boo et al. | |
| 2016/0192775 A1 | 7/2016 | Andersson | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |

(56) References Cited

U.S. PATENT DOCUMENTS

| | | |
|---|---|---|
| 2017/0234346 A1 | 8/2017 | Fridlund |
| 2017/0298973 A1 | 10/2017 | Derelöv |
| 2017/0360193 A1 | 12/2017 | Boo |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0178406 A1 | 6/2018 | Fransson et al. |
| 2019/0113061 A1 | 4/2019 | Håkansson et al. |
| 2019/0166989 A1 | 6/2019 | Boo et al. |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0214447 A1 | 7/2020 | Derelöv et al. |

FOREIGN PATENT DOCUMENTS

| | | | |
|---|---|---|---|
| CH | 698988 B1 * | 12/2009 | ............... E04C 2/12 |
| CN | 203424576 U | 2/2014 | |
| DE | 26 35 237 A | 2/1978 | |
| DE | 20 2009 008 825 U1 | 10/2009 | |
| DE | 10 2009 041 142 A1 | 3/2011 | |
| DE | 10 2014 110 124 A1 | 1/2016 | |
| EP | 0 362 968 A | 4/1990 | |
| EP | 0 675 332 A2 | 10/1995 | |
| EP | 0 871 156 A2 | 10/1998 | |
| EP | 1 048 423 A2 | 11/2000 | |
| EP | 1 048 423 B9 | 5/2005 | |
| EP | 1 650 375 A1 | 4/2006 | |
| EP | 1 671 562 A1 | 6/2006 | |
| EP | 1 863 984 A | 12/2007 | |
| EP | 1 922 954 A1 | 5/2008 | |
| EP | 2 017 403 A2 | 1/2009 | |
| EP | 2 037 128 A1 | 3/2009 | |
| EP | 1 922 954 B1 | 7/2009 | |
| EP | 2 333 353 A2 | 6/2011 | |
| EP | 1 863 984 B1 | 11/2011 | |
| EP | 3031998 A1 * | 6/2016 | ........ E04F 15/02038 |
| FR | 2 062 731 A5 | 6/1971 | |
| FR | 2 517 187 A1 | 6/1983 | |
| GB | 1 022 377 A | 3/1966 | |
| GB | 2 482 213 A | 1/2012 | |
| JP | 2003-239921 A | 8/2003 | |
| KR | 10-1147274 B1 | 5/2012 | |
| KR | 2014-0042314 A | 4/2014 | |
| WO | WO 87/07339 A1 | 12/1987 | |
| WO | WO 00/66856 A1 | 11/2000 | |
| WO | WO 01/02669 A1 | 1/2001 | |
| WO | WO 01/02670 A1 | 1/2001 | |
| WO | WO 01/51733 A1 | 7/2001 | |
| WO | WO 01/53628 A1 | 7/2001 | |
| WO | WO 02/055809 A1 | 7/2002 | |
| WO | WO 02/055810 A1 | 7/2002 | |
| WO | WO 03/016654 A1 | 2/2003 | |
| WO | WO 03/083234 A1 | 10/2003 | |
| WO | WO 2004/079130 A1 | 9/2004 | |
| WO | WO 2005/068747 A1 | 7/2005 | |
| WO | WO 2006/043893 A1 | 4/2006 | |
| WO | WO 2006/104436 A1 | 10/2006 | |
| WO | WO 2007/015669 A2 | 2/2007 | |
| WO | WO 2007/015669 A3 | 2/2007 | |
| WO | WO 2007/079845 A1 | 7/2007 | |
| WO | WO 2008/004960 A2 | 1/2008 | |
| WO | WO 2008/004960 A8 | 1/2008 | |
| WO | WO 2008/017281 A1 | 2/2008 | |
| WO | WO 2008/017301 A2 | 2/2008 | |
| WO | WO 2008/017301 A3 | 2/2008 | |
| WO | WO 2008/150234 A1 | 12/2008 | |
| WO | WO 2010/070472 A2 | 6/2010 | |
| WO | WO 2010/070472 A3 | 6/2010 | |
| WO | WO 2010/070605 A2 | 6/2010 | |
| WO | WO 2010/070605 A3 | 6/2010 | |
| WO | WO 2010/082171 A2 | 7/2010 | |
| WO | WO 2010/087752 A1 | 8/2010 | |
| WO | WO 2011/012104 A2 | 2/2011 | |
| WO | WO 2011/012104 A3 | 2/2011 | |
| WO | WO 2011/085710 A1 | 7/2011 | |
| WO | WO 2011/151737 A2 | 12/2011 | |
| WO | WO 2011/151737 A3 | 12/2011 | |
| WO | WO 2011/151737 A9 | 12/2011 | |
| WO | WO 2011/151758 A2 | 12/2011 | |
| WO | WO 2011/151758 A3 | 12/2011 | |
| WO | WO 2012/095454 A1 | 7/2012 | |
| WO | WO 2012/154113 A1 | 11/2012 | |
| WO | WO 2013/025163 A1 | 2/2013 | |
| WO | WO 2013/080160 A1 | 6/2013 | |
| WO | WO 2013/093636 A2 | 6/2013 | |
| WO | WO 2013/093636 A3 | 6/2013 | |
| WO | WO 2013/118075 A1 | 8/2013 | |
| WO | WO 2014/108114 A1 | 7/2014 | |
| WO | 2015/038059 A1 | 3/2015 | |
| WO | WO 2015/105449 A1 | 7/2015 | |
| WO | WO 2015/105450 A1 | 7/2015 | |
| WO | WO 2015/105451 A1 | 7/2015 | |

OTHER PUBLICATIONS

Boo, Christian, et al., U.S. Appl. No. 14/972,949, entitled "Panels Comprising a Mechanical Locking Device and an Assembled Product Comprising the Panels," filed in the U.S. Patent and Trademark Office on Dec. 17, 2015.

International Search Report dated Apr. 22, 2015 in PCT/SE2014/051522, ISA/SE, Patent-och registreringsverket, Stockholm, SE, 5 pages.

Derelöv, Peter, et al., U.S. Appl. No. 14/794,883, entitled "Panel With a Slider," filed in the U.S. Patent and Trademark Office on Jul. 9, 2015.

U.S. Appl. No. 14/158,165, Peter Derelöv, Hans Brännström and Agne Pålsson, filed Jan. 17, 2014.

U.S. Appl. No. 14/486,681, Hans Brännström, Agne Pålsson and Peter Derelöv, filed Sep. 15, 2014.

U.S. Appl. No. 14/515,988 (Cited herein as US Patent Application Publication No. US 2015/0035422 A1 of Feb. 5, 2015), Niclas Håkansson and Darko Pervan, filed Oct. 16, 2014.

U.S. Appl. No. 14/573,473, Peter Derelöv, filed Dec. 17, 2014.

Derelöv, Peter, et al., U.S. Appl. No. 14/158,165, entitled "Assembled Product and a Method of Assembling the Product," filed in the U.S. Patent and Trademark Office on Jan. 17, 2014.

Brännström, Hans, et al., U.S. Appl. No. 14/486,681, entitled "An Assembled Product and a Method of Assembling the Assembled Product," filed in the U.S. Patent and Trademark Office on Sep. 15, 2014.

Derelov, Peter, U.S. Appl. No. 14/573,473, entitled "Panels Comprising a Mechanical Locking Device and an Assembled Product Comprising the Panels," filed in the U.S. Patent and Trademark Office on Dec. 17, 2014.

U.S. Appl. No. 15/171,403, Peter Derelöv, filed Jun. 2, 2016.

Derelöv, Peter, U.S. Appl. No. 15/171,403 entitled "Panel with a Slider", filed in the U.S. Patent and Trademark Office on Jun. 2, 2016.

U.S. Appl. No. 15/271,622, Peter Derelöv, filed Sep. 21, 2016.

U.S. Appl. No. 15/308,872, Darko Pervan, filed Nov. 4, 2016.

U.S. Appl. No. 15/366,704, Peter Derelöv, filed Dec. 1, 2016.

U.S. Appl. No. 15/379,791, Niclas Håkansson, filed Dec. 15, 2016.

U.S. Appl. No. 15/415,356, Peter Derelöv, filed Jan. 25, 2017.

U.S. Appl. No. 15/422,798, Magnus Fridlund, filed Feb. 2, 2017.

U.S. Appl. No. 15/428,469, Magnus Fridlund, filed Feb. 9, 2017.

U.S. Appl. No. 15/428,504, Christian Boo, filed Feb. 9, 2017.

U.S. Appl. No. 15/432,190, Magnus Fridlund, filed Feb. 14, 2017.

Derelöv, Peter, et al., U.S. Appl. No. 15/271,622 entitled "Panels Comprising Mechanical Locking Device and an Assembled Product Comprising the Panels", filed in the U.S. Patent and Trademark Office on Sep. 21, 2016.

(56) References Cited

OTHER PUBLICATIONS

Pervan, Darko, U.S. Appl. No. 15/308,872 entitled "Mechanical Locking System for Building Panels," filed in the U.S. Patent and Trademark Office on Nov. 4, 2016.
Derelöv, Peter, U.S. Appl. No. 15/366,704 entitled "Panels Comprising a Mechanical Locking Device and an Assembled Product Comprising the Panels", filed in the U.S. Patent and Trademark Office on Dec. 1, 2016.
Håkansson, Niclas, et al., U.S. Appl. No. 15/379,791 entitled "Mechanical Locking System for Building Panels," filed in the U.S. Patent and Trademark Office on Dec. 15, 2016.
Derelöv, Peter, et al., U.S. Appl. No. 15/415,356 entitled "Panels Comprising a Mechanical Locking Device and an Assembled Product Comprising the Panels", filed in the U.S. Patent and Trademark Office on Jan. 25, 2017.
Fridlund, Magnus, U.S. Appl. No. 15/422,798 entitled "Set of Panels for an Assembled Product," filed in the U.S. Patent and Trademark Office on Feb. 2, 2017.
Fridlund, Magnus, U.S. Appl. No. 15/428,469 entitled "Element and Method for Providing Dismantling Groove," filed in the U.S. Patent and Trademark Office on Feb. 9, 2017.
Boo, Christian, U.S. Appl. No. 15/428,504 entitled "Set of Panel-Shaped Elements for a Composed Element," filed in the U.S. Patent and Trademark Office on Feb. 9, 2017.
Fridlund, Magnus, U.S. Appl. No. 15/432,190 entitled "Method for Forming a Panel," filed in the U.S. Patent and Trademark Office on Feb. 14, 2017.
Extended European Search issued in EP Patent Application No. 14878105.7, dated May 19, 2017, European Patent Office, Munich DE, 6 pages.
U.S. Appl. No. 15/584,633, Christian Boo, filed May 2, 2017.
U.S. Appl. No. 15/642,757, Peter Derelöv, filed Jul. 6, 2017.
U.S. Appl. No. 15/646,714, Peter Derelöv, filed Jul. 11, 2017.
Boo, Christian, et al., U.S. Appl. No. 15/584,633 entitled "Panels Comprising a Mechanical Locking Device and an Assembled Product Comprising the Panels", filed in the U.S. Patent and Trademark Office on May 2, 2017.
Derelöv, Peter., U.S. Appl. No. 15/642,757 entitled "Panels Comprising a Mechanical Locking Device and an Assembled Product Comprising the Panels", filed in the U.S. Patent and Trademark Office on Jul. 6, 2017.
Derelöv, Peter, et al., U.S. Appl. No. 15/646,714 entitled "Assembled Product and a Method of Assembling the Product", filed in the U.S. Patent and Trademark Office on Jul. 11, 2017.
U.S. Appl. No. 15/562,254, Peter Derelöv, filed Sep. 27, 2017.
U.S. Appl. No. 15/567,507, Christian Boo, Peter Derelöv and Agne Pålsson, filed Oct. 18, 2017.
U.S. Appl. No. 15/794,491, Peter Derelöv, filed Oct. 26, 2017.
U.S. Appl. No. 15/848,164, Jonas Fransson, Andreas Blomgren and Karl Erikson, filed Dec. 20, 2017.
Derelöv, Peter, U.S. Appl. No. 15/562,254 entitled "Panel with a Slider", filed in the U.S. Patent and Trademark Office on Sep. 27, 2017.
Boo, Christian, et al., U.S. Appl. No. 15/567,507 entitled "Panel With a Fastening Device," filed in the U.S. Patent and Trademark Office on Oct. 18, 2017.
Derelöv, Peter, U.S. Appl. No. 15/794,491 entitled "Set of Panels with a Mechanical Locking Device", filed in the U.S. Patent and Trademark Office on Oct. 26, 2017.
Fransson, Jonas, et al., U.S. Appl. No. 15/848,164 entitled "Device for Inserting a Tongue", filed in the U.S. Patent and Trademark Office on Dec. 20, 2017.
U.S. Appl. No. 15/923,701, Peter Derelöv, filed Mar. 16, 2018.
Derelöv, Peter, U.S. Appl. No. 15/923,701 entitled "Panels Comprising a Mechanical Locking Device and an Assembled Product Comprising the Panels", filed in the U.S. Patent and Trademark Office on Mar. 16, 2018.
U.S. Appl. No. 15/956,949, Peter Derelöv, filed Apr. 19, 2018.
U.S. Appl. No. 15/978,630, Jonas Fransson, Niclas Håkansson and and Agne Pålsson, filed May 14, 2018.
U.S. Appl. No. 16/027,479, Christian Boo and Peter Derelöv, filed Jul. 5, 2018.
Derelöv, Peter, U.S. Appl. No. 15/956,949 entitled "Panels for an Assembled Product", filed in the U.S. Patent and Trademark Office on Apr. 19, 2018.
Fransson, Jonas, et al., U.S. Appl. No. 15/978,630 entitled "Elements and a Locking Device for an Assembled Product," filed in the U.S. Patent and Trademark Office on May 14, 2018.
Boo, Christian, et al., U.S. Appl. No. 16/027,479 entitled "Panels Comprising a Mechanical Locking Device and an Assembled Product Comprising the Panels," filed in the U.S. Patent and Trademark Office on Jul. 5, 2018.
U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/228,975, Niclas Håkansson and Darko Pervan, filed Dec. 21, 2018.
Derelöv, Peter, U.S. Appl. No. 16/220,574 entitled "Set of Panels," filed in the U.S. Patent and Trademark Office on Dec. 14, 2018.
Derelöv, Peter, U.S. Appl. No. 16/220,585 entitled "Set of Panels," filed in the U.S. Patent and Trademark Office on Dec. 14, 2018.
Håkansson, Niclas, et al., U.S. Appl. No. 16/228,975 entitled "Mechanical Locking System for Building Panels," filed in the U.S. Patent and Trademark Office on Dec. 21, 2018.
Derelöv, Peter, et al., U.S. Appl. No. 16/361,609 entitled "Panels Comprising a Mechanical Locking Device and an Assembled Product Comprising the Panels," filed in the U.S. Patent and Trademark Office on Mar. 22, 2019.
Boo, Christian, U.S. Appl. No. 16/386,732 entitled "Set of Panels With a Mechanical Locking Device," filed in the U.S. Patent and Trademark Office on Apr. 17, 2019.
Boo, Christian, U.S. Appl. No. 16/386,810 entitled "Set of Panels With a Mechanical Locking Device," filed in the U.S. Patent and Trademark Office on Apr. 17, 2019.
Boo, Christian, U.S. Appl. No. 16/386,824 entitled "Set of Panels With a Mechanical Locking Device," filed in the U.S. Patent and Trademark Office on Apr. 17, 2019.
Derelöv, Peter, U.S. Appl. No. 16/386,874 entitled "Symmetric Tongue and T-Cross," filed in the U.S. Patent and Trademark Office on Apr. 17, 2019.
U.S. Appl. No. 16/553,325, Peter Derelöv and Johan Svensson, filed Aug. 28, 2019.
U.S. Appl. No. 16/553,350, Peter Derelöv and Johan Svensson, filed Aug. 28, 2019.
U.S. Appl. No. 16/564,438, Hans Brännström, Agne Pålsson and Peter Derelöv, filed Sep. 9, 2019.
U.S. Appl. No. 16/567,436, Peter Derelöv and Mats Nilsson, filed Sep. 11, 2019.
U.S. Appl. No. 16/663,603, Magnus Fridlund, filed Oct. 25, 2019.
Derelöv, Peter, U.S. Appl. No. 16/553,325 entitled "Set of Panels with a Mechanical Locking Device," filed in the U.S. Patent and Trademark Office on Aug. 28, 2019.
Derelöv, Peter, U.S. Appl. No. 16/553,350 entitled "Set of Panels with a Mechanical Locking Device," filed in the U.S. Patent and Trademark Office on Aug. 28, 2019.
Brännström, Hans, et al., U.S. Appl. No. 16/564,438 entitled "Assembled Product and a Method of Assembling the Assembled Product," filed in the U.S. Patent and Trademark Office on Sep. 9, 2019.
Derelöv, Peter, U.S. Appl. No. 16/567,436 entitled "Panels Comprising a Mechanical Locking Device and an Assembled Product Comprising the Panels," filed in the U.S. Patent and Trademark Office on Sep. 11, 2019.
Fridlund, Magnus, U.S. Appl. No. 16/663,603 entitled "Element and Method for Providing Dismantling Groove," filed in the U.S. Patent and Trademark Office on Oct. 25, 2019.
Boo, Christian, et al., U.S. Appl. No. 16/697,335 entitled "Panels Comprising a Mechanical Locking Device and an Assembled Product Comprising the Panels," filed in the U.S. Patent and Trademark Office on Nov. 27, 2019.
Fridlund, Magnus, U.S. Appl. No. 16/703,077 entitled "Set of Panels for an Assembled Product," filed in the U.S. Patent and Trademark Office Dec. 4, 2019.

(56) References Cited

OTHER PUBLICATIONS

Derelöv, Peter, et al., U.S. Appl. No. 16/722,096 entitled "Panels Comprising a Mechanical Locking Device and an Assembled Product Comprising the Panels," filed in the U.S. Patent and Trademark Office on Dec. 20, 2019.
\*\*Derelöv, Peter, U.S. Appl. No. 16/861,639 entitled "Panels Comprising a Mechanical Locking Device and an Assembled Product Comprising the Panels," filed in the U.S. Patent and Trademark Office dated Apr. 29, 2020.
\*\*Pervan, Darko, U.S. Appl. No. 16/946,047 entitled "Mechanical Locking System for Building Panels," filed in the U.S. Patent and Trademark Office dated Jun. 4, 2020.
\*\*Brännström, Hans, et al., U.S. Appl. No. 16/915,258 entitled "Assembled Product and Method of Assembling the Assembled Product," filed in the U.S. Patent and Trademark Office dated Jun. 29, 2020.

\* cited by examiner

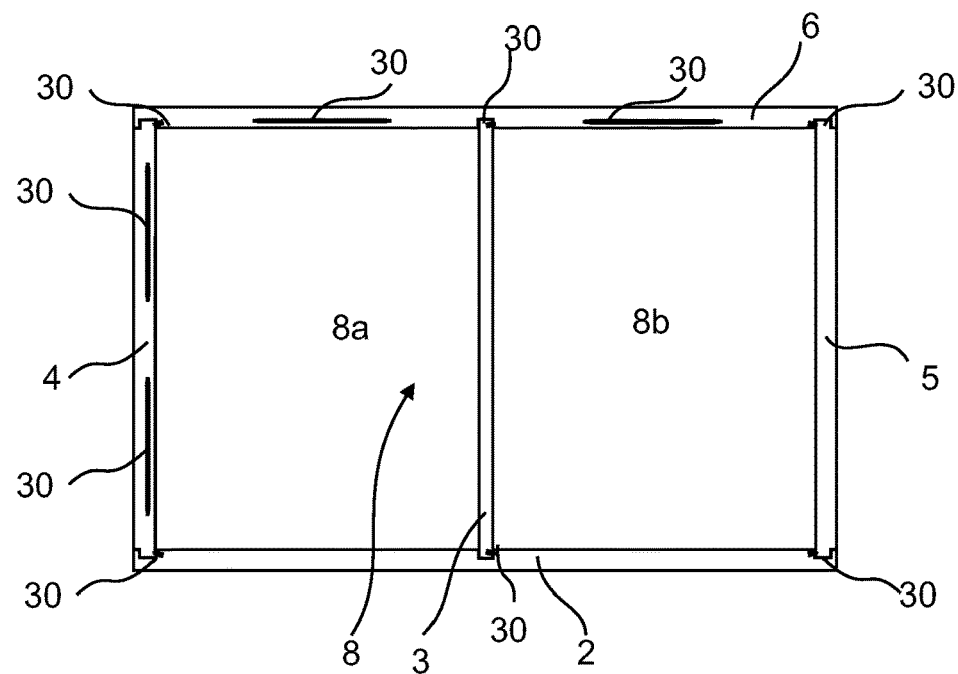
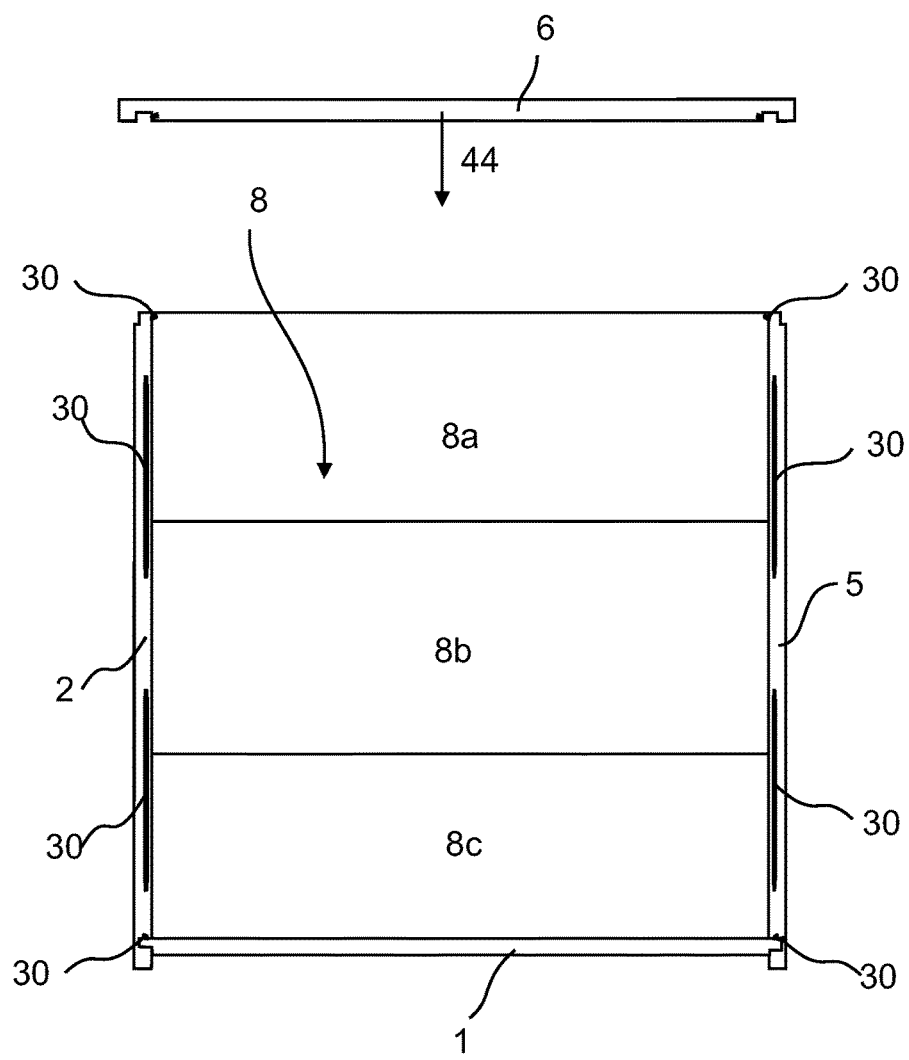

FURNITURE PANEL

CROSS REFERENCE TO RELATED APPLICATIONS

The present application claims the benefit of Swedish Application No. 1450018-5, filed on Jan. 10, 2014. The entire contents of each of U.S. application Ser. No. 14/158,165 and Swedish Application No. 1450022-7 are hereby incorporated herein by reference in their entirety.

TECHNICAL FIELD

The present disclosure relates to a furniture panel, such as a back panel or a bottom panel, comprising a first element and a second element. The present disclosure also relates to an assembled product, such as a bookshelf, a cupboard, a wardrobe, a box, a drawer or a furniture component, comprising the furniture panel.

BACKGROUND

A furniture panel, such as a back panel or bottom panel, comprising a first element and a second element is known. The first element and the second element of the known furniture panel may be fixed by nailing the first element and the second element to a frame of an assembled product.

SUMMARY

One object of certain embodiments of the present disclosure is to provide an improvement over the above described technique and the known art. A specific objective is to improve the strength of a furniture panel, such as a back panel or bottom panel, comprising a first element and a second element. Another objective is to decrease the package size of a so-called flat-pack furniture. The back panel or the bottom panel of a flat-pack furniture may be the largest panel of the furniture compared to other panels of the furniture. A large furniture panel divided into two or more separate elements that can be mechanically locked together to form the large panel may therefore decrease the package size of the flat-pack furniture.

A further object of the present disclosure is to provide an assembled product with increased strength and stability.

At least some of these and other objects and advantages that will be apparent from the description have been achieved by a furniture panel comprising a first element and a second element which are configured to be locked together. A first main plane of the first element is essentially parallel to a second main plane of the second element when the first element and the second element are locked together. Essentially parallel meaning that the first element is arranged at an angle of 0°±10° to the second element, including being arranged parallel. The furniture panel comprises a first face and an opposite second face which are parallel to a main plane of the furniture panel when the first element and the second element are locked together. The first element and the second element is provided with a mechanical locking system comprising:
- a first tongue provided at a first edge of the first element, wherein the first tongue is configured to cooperate with a first tongue groove provided at a second edge of the second element for locking together the first element and the second element in a vertical direction perpendicular to the main plane of the furniture panel;
- a second tongue at the second edge of the second element, wherein the second tongue is configured to cooperate with a second tongue groove at the first edge of the first element for locking together the first element and the second element in the vertical direction;
- a first pair of locking surfaces provided above the second tongue and the second tongue groove for locking together the first element and the second element in a horizontal direction parallel to the main plane of the furniture panel; and
- second pair of locking surfaces provided below the first tongue and the first tongue groove for locking together the first element and the second element in the horizontal direction.

The mechanical locking system may provide a furniture panel with a joint between the first element and the second element that is hard to detect at the first face and the second face of the furniture panel. Further, the first tongue and the second tongue and the first tongue groove and the second tongue groove may provide a connection in the furniture panel that is essentially planar at the joint between the first element and the second element.

The first pair of locking surfaces is preferably essentially vertical and the second pair of locking surfaces is also preferably essentially vertical. Essentially vertical meaning that locking surfaces are vertical ±10°, including being vertical.

The first tongue and the first tongue groove may cooperate at a third pair of locking surfaces that is preferably arranged essentially horizontally. Essentially horizontal meaning that locking surfaces are horizontal ±10°, including being horizontal.

The second tongue and the second tongue groove may cooperate at a fourth pair of locking surfaces that is preferably arranged at an angle to the main plane of the furniture panel that is greater than zero. The angle preferably allows the first element to be locked to the second element by an angling motion of the first element relative to the second element or of the second element relative to the first element, wherein the first tongue is inserted in the first tongue groove. The angle may be in the range of about 30° to about 60°, and is preferably about 45°.

A first space may be provided in the first tongue groove above the first tongue in a locked state of the first element and the second element. A second space may be provided in the second tongue groove under the second tongue in a locked state of the first element and the second element.

The second element includes a strip extending between the protruding element and the first tongue groove, and the strip includes a recess adjacent the protruding element.

A gap may be provided below the first pair of locking surfaces and above the second tongue when the first element and the second element are locked together. In addition, a gap may be provided below the first tongue and above the second pair of locking surfaces when the first element and the second element are locked together.

A core material of the first element and the second element preferably comprises a wood fibre based board, such as a HDF, MDF, plywood, solid wood or particleboard, a plastic board, or a wood plastic board.

The mechanical locking system is preferably made by mechanical cutting, such as milling, of the first edge of the first element and the second edge of the second element.

A second aspect of the present disclosure is an assembled product, such as a furniture component, comprising the furniture panel described above. The assembled product is preferably configured to be assembled without tools.

BRIEF DESCRIPTION OF THE DRAWINGS

Embodiments of the present disclosure will by way of example be described in more detail with reference to the appended schematic drawings, in which:

FIG. 2A shows an embodiment of a furniture component comprising a furniture panel according to an embodiment of the disclosure.

FIG. 2B shows an embodiment of a furniture component comprising the furniture panel according to an embodiment of the disclosure.

DETAILED DESCRIPTION

Figure 1A:
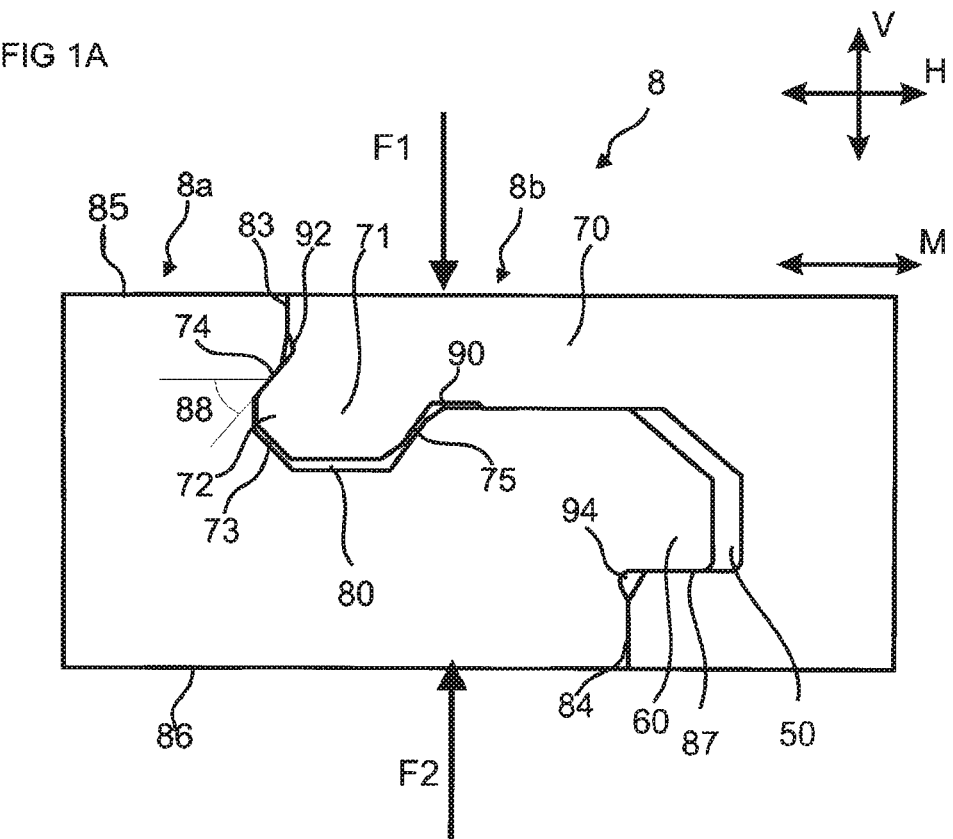
FIG. 1A shows a furniture panel according to an embodiment of the disclosure.

FIG. 1A shows an embodiment of a furniture panel 8, such as a back panel or bottom panel. The furniture panel 8 comprises a first element 8a and a second element 8b which are configured to be locked together. A first main plane of the first element is essentially parallel to a second main plane of the second element when the first element 8a and the second element 8b are locked together. The furniture panel 8 comprises a first face 85 and an opposite second face 86 which are parallel to a main plane M of the furniture panel 8 when the first element 8a and the second element 8b are locked together. The first element and the second element are provided with a mechanical locking system comprising:
- a first tongue 60 provided at a first edge of the first element 8a, wherein the first tongue 60 is configured to cooperate with a first tongue groove 50 provided at a second edge of the second element 8b for locking together the first element 8a and the second element 8b in a vertical direction V;
- a second tongue 72 at the second edge of the second element 8b, wherein the second tongue 72 is configured to cooperate with a second tongue groove 73 at the first edge of the first panel 8a for locking together the first element 8a and the second element 8b in the vertical direction V;
- a first pair of locking surfaces 83 provided above the second tongue 72 and the second tongue groove 73 for locking together the first element 8a and the second element 8b in a horizontal direction H parallel to the main plane M of the furniture panel 8; and
- second pair of locking surfaces 84 provided below the first tongue 60 and the first tongue groove 50 for locking together the first element 8a and the second element 8b in the horizontal direction H.

The mechanical locking system is preferably made by mechanical cutting, such as milling, of the first edge of the first element 8a and the second edge of the second element 8b.

The first pair of locking surfaces 83 is preferably essentially vertical. The second pair of locking surfaces 84 is also preferably essentially vertical.

The first tongue 60 and the first tongue groove 50 cooperate at a third pair of locking surfaces 87 that is preferably arranged essentially horizontally.

Figure 1B:
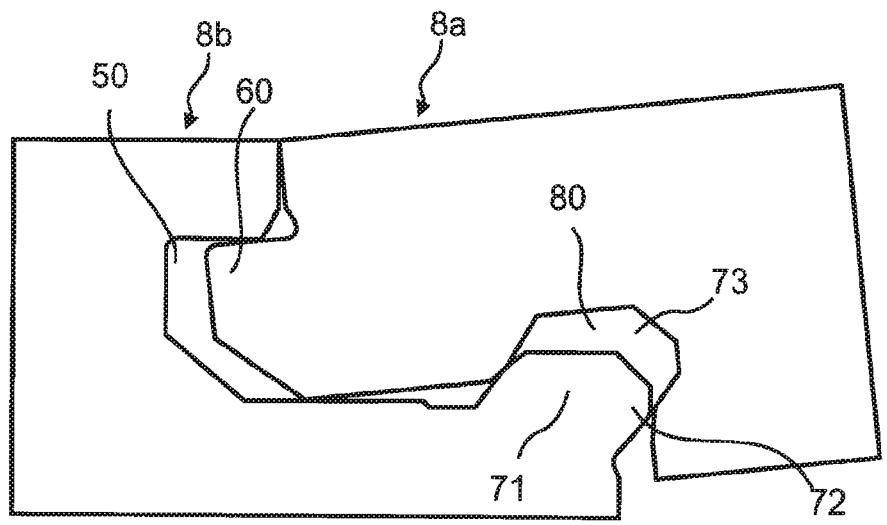
FIG. 1B shows the furniture panel according to an embodiment of the disclosure.

The second tongue 72 and the second tongue groove 73 cooperate at a fourth pair of locking surfaces 74 that is preferably arranged at an angle 88 to the main plane M of the furniture panel 8 that is greater than zero. The angle 88 has a range that allows the first element 8a to be locked to the second element 8b by an angling motion of the first element 8a relative to the second element 8b or of the second element 8b relative to the first element 8a, wherein the first tongue 60 is inserted in the first tongue groove 50. An embodiment of the angling motion of the first element 8a relative to the second element 8b is shown in FIG. 1B.

The first face 85 is arranged upwards in the vertical direction, e.g., in the direction were the greatest load F1 is likely to be exerted on the furniture panel 8, to prevent the first element 8a and the second element 8b from being unlocked by a reversed angling motion.

The second face 86 is arranged downwards in the vertical direction, e.g., in the direction where the smallest load F2 is likely to be applied on the furniture panel 8. The second tongue 72 and the second tongue groove 73 may provide a resistance for unlocking of the first element 8a and the second element 8b by a reversed angling motion.

The angle 88 may be in the range of about 30° to about 60°. The angle is preferably about 45°.

A first space may be provided in the first tongue groove 50 above the first tongue 60 in a locked state of the first element 8a and the second element 8b. A second space may be provided in the second tongue groove 73 under the second tongue 72 in a locked state of the first element 8a and the second element 8b.

The second edge of the second element 8b may be provided with a protruding element 71 that essentially matches a third groove 80 provided at the first edge of the first element 8a. The protruding element 71 may protrude upwards in the vertical direction V and the groove 80 may be open downwards in the vertical direction V. A third space 75, that extends in the horizontal direction H, may be provided between the protruding element 73 and the third groove 80. The third space 75 may facilitate the locking by an angling motion.

The second element 8b includes a strip 70 extending between the protruding element 71 and the first tongue groove 50. The strip 70 may include a recess 90 adjacent the protruding element 71. The recess 90 may provide the protruding element 71 with flexibility during locking of the first element 8a with the second element 8b.

In some embodiments, a gap 92 is provided below the first pair of locking surfaces 83 and above the second tongue 72 when the first element 8a and the second element 8b are locked together. In addition, a gap 94 may be provided below the first tongue 60 and above the second pair of locking surfaces 84 when the first element 8a and the second element 8b are locked together.

A core material of the first element 8a and the second element 8b in the various embodiments above preferably comprises a wood fibre based board, such as a HDF, MDF, plywood, solid wood or particleboard, a plastic board, or a wood fibre composite board.

FIGS. 2A-2B show embodiments of an assembled product, such as a furniture component, comprising embodiments of the furniture panel 8 disclosed above. FIG. 2A shows an embodiment of the assembled product, such as a cupboard. The assembled product includes a frame formed by perimeter panels 2, 4, 5, 6, and the first element 8a and the second element 8b serving as a back furniture panel 8. The assembled product may also include a divider panel 3. Edges of the panels 2, 3, 4, 5, 6 may be locked together as shown in FIG. 2A with a mechanical device comprising a flexible tongue 30.

FIG. 2B shows an embodiment comprising a third element 8c, which is connected to the second element 8b with the mechanical locking system discussed above. This assembled product is in the form of a drawer, with end panels 1 and 6 serving as back and front ends of the drawer, respectively. The mechanical device may comprising the flexible tongue 30 may facilitate an assembling of the assembled product without the use of tools and/or binding agents such as glue. For instance, end panel 6 is moved into engagement with a partially assembled product in the direction of arrow 44 so that the flexible tongue 30 engages with other parts of the mechanical device to effectuate locking.

Edges of the furniture panel may be inserted into grooves at bottom edges of the perimeter panels. The furniture panel is preferably locked to at least two of the perimeter panels by a mechanical device comprising a flexible tongue 30. Examples of such locking may be found in U.S. application Ser. No. 14/486,681, which is hereby incorporated by reference in its entirety.

When the word "about" is used in this specification in connection with a numerical value, it is intended that the associated numerical value include a tolerance of +/−10% around the stated numerical value.

The invention claimed is:

1. A furniture panel comprising a first element and a second element which are configured to be locked together, wherein a first main plane of the first element is essentially parallel to a second main plane of the second element when the first element and the second element are locked together, wherein the furniture panel comprises a first face and an opposite second face which are parallel to a main plane of the furniture panel when the first element and the second element are locked together, and the first element and the second element are provided with a mechanical locking system, the mechanical locking system comprising:
   a first tongue provided at a first edge of the first element, wherein the first tongue is configured to cooperate with a first tongue groove provided at a second edge of the second element for locking together the first element and the second element in a first direction perpendicular to the main plane of the furniture panel, at least a portion of the first tongue groove being spaced from the second face by a first lip extending from the second element along a second direction parallel to the main plane of the furniture panel;
   a second tongue at the second edge of the second element, wherein the second tongue is configured to cooperate with a second tongue groove at the first edge of the first element for locking together the first element and the second element in the first direction, at least a portion of the second tongue groove being spaced from the first face by a second lip extending from the first element along the second direction;
   a first pair of locking surfaces provided between (a) the second tongue and the second tongue groove and (b) the first face for locking together the first element and the second element in the second direction; and
   a second pair of locking surfaces provided between (a) the first tongue and the first tongue groove and (b) the second face for locking together the first element and the second element in the second direction, wherein the second pair of locking surfaces is offset in the second direction from the first pair of locking surfaces.

2. The furniture panel as claimed in claim 1, wherein the first pair of locking surfaces extends essentially in the first direction.

3. The furniture panel as claimed in claim 1, wherein the second pair of locking surfaces extends essentially in the first direction.

4. The furniture panel as claimed in claim 1, wherein the first tongue and the first tongue groove cooperate at a third pair of locking surfaces that is arranged essentially in the second direction.

5. The furniture panel as claimed in claim 4, wherein the second tongue and the second tongue groove cooperate at a fourth pair of locking surfaces that is arranged at an angle greater than zero relative to an imaginary line extending in the second direction.

6. The furniture panel as claimed in claim 5, wherein the locking surfaces of the fourth pair contact each other along a contact portion extending at the angle greater than zero relative to the imaginary line extending in the second direction.

7. The furniture panel as claimed in claim 5, wherein a gap is provided between the first pair of locking surfaces and the second tongue when the first element and the second element are locked together.

8. The furniture panel as claimed in claim 7, wherein a second gap is provided between the first tongue and the second pair of locking surfaces when the first element and the second element are locked together.

9. The furniture panel as claimed in claim 8, wherein the first direction is vertical and the second direction is horizontal.

10. The furniture panel as claimed in claim 1, wherein the second tongue and the second tongue groove cooperate at a fourth pair of locking surfaces that is arranged at an angle greater than zero relative to an imaginary line extending in the second direction.

11. The furniture panel as claimed in claim 10, wherein the angle is configured so that the first element is locked to the second element by an angling motion of the first element relative to the second element or of the second element relative to the first element, wherein the first tongue is inserted in the first tongue groove.

12. The furniture panel as claimed in claim 10, wherein the angle is in a range of about 30° to about 60°.

13. The furniture panel as claimed in claim 10, wherein the locking surfaces of the fourth pair contact each other along a contact portion extending at the angle greater than zero relative to the imaginary line extending in the second direction.

14. The furniture panel as claimed in claim 1, wherein a first space is provided in the first tongue groove between the first tongue and the first face in a locked state of the first element and the second element.

15. The furniture panel as claimed in claim 1, wherein a space is provided in the second tongue groove between the second tongue and the second face in a locked state of the first element and the second element.

16. The furniture panel as claimed in claim 1, wherein a core material of the first element and the second element comprises a wood fibre based board that is at least one of HDF, MDF, plywood, solid wood or particleboard, a plastic board and a wood fibre composite board.

17. The furniture panel as claimed in claim 1, wherein the second element includes a protruding element at a distal end of the second edge, and a strip extending between the protruding element and the first tongue groove, the strip including a recess adjacent the protruding element.

18. The furniture panel as claimed in claim 1, wherein a gap is provided between the first pair of locking surfaces and the second tongue when the first element and the second element are locked together.

19. The furniture panel as claimed in claim 1, wherein a gap is provided between the first tongue and the second pair of locking surfaces when the first element and the second element are locked together.

20. The furniture panel as claimed in claim 1, wherein the first direction is vertical and the second direction is horizontal.

21. A furniture panel comprising a first element and a second element which are configured to be locked together, wherein a first main plane of the first element is essentially parallel to a second main plane of the second element when the first element and the second element are locked together, wherein the furniture panel comprises a first face and an opposite second face which are parallel to a main plane of the furniture panel when the first element and the second element are locked together, and the first element and the second element are provided with a mechanical locking system, the mechanical locking system comprising:

a first tongue provided at a first edge of the first element, wherein the first tongue is configured to cooperate with a first tongue groove provided at a second edge of the second element for locking together the first element and the second element in a first direction perpendicular to the main plane of the furniture panel;

a second tongue at the second edge of the second element, wherein the second tongue is configured to cooperate with a second tongue groove at the first edge of the first element for locking together the first element and the second element in the first direction;

a first pair of locking surfaces provided between (a) the second tongue and the second tongue groove and (b) the first face for locking together the first element and the second element in a second direction parallel to the main plane of the furniture panel; and a second pair of locking surfaces provided between (a) the first tongue and the first tongue groove and (b) the second face for locking together the first element and the second element in the second direction, wherein the second pair of locking surfaces is offset in the second direction from the first pair of locking surfaces, wherein, in the second direction, the first pair of locking surfaces and the second pair of locking surfaces are located between an outermost extent of the first tongue and an outermost extent of the second tongue.

* * * * *